United States Patent
Kodde

(10) Patent No.: US 9,535,702 B2
(45) Date of Patent: Jan. 3, 2017

(54) ASSET MANAGEMENT DEVICE AND METHOD IN A HARDWARE PLATFORM

(71) Applicant: ENYX SA, Paris (FR)

(72) Inventor: Edward Kodde, Paris (FR)

(73) Assignee: ENYX SA, Paris (FR)

( * ) Notice: Subject to any disclaimer, the term of this patent is extended or adjusted under 35 U.S.C. 154(b) by 172 days.

(21) Appl. No.: 14/502,963

(22) Filed: Sep. 30, 2014

(65) Prior Publication Data

US 2015/0095613 A1    Apr. 2, 2015

(30) Foreign Application Priority Data

Oct. 1, 2013  (EP) ..................................... 13306356

(51) Int. Cl.
| | | |
|---|---|---|
| G06F 12/00 | (2006.01) | |
| G06F 9/38 | (2006.01) | |
| G06Q 40/04 | (2012.01) | |
| G06F 21/71 | (2013.01) | |
| G06F 21/79 | (2013.01) | |
| H04L 9/08 | (2006.01) | |

(52) U.S. Cl.
CPC ............. *G06F 9/3824* (2013.01); *G06F 21/71* (2013.01); *G06F 21/79* (2013.01); *G06Q 40/04* (2013.01); *H04L 9/0894* (2013.01)

(58) Field of Classification Search
CPC .... G06F 12/1018; G06F 12/04; G06F 9/3824; G06F 2212/1024
USPC ........................................................ 711/212
See application file for complete search history.

(56) References Cited

U.S. PATENT DOCUMENTS

| | | |
|---|---|---|
| 5,032,987 A | 7/1991 | Broder et al. |
| 7,921,046 B2 | 4/2011 | Parsons et al. |
| 2003/0182291 A1 | 9/2003 | Kurupati et al. |
| 2008/0243675 A1 | 10/2008 | Parsons et al. |

FOREIGN PATENT DOCUMENTS

EP    0411691 A2    2/1991

OTHER PUBLICATIONS

John Cieslewicz, et al., "Adaptive Aggregation on chip Multiprocessors", URL:http://www.vldb.org/conf/2007/papers/research/p339-cieslewicz.pdf, Sep. 25, 2007, pp. 339-350, XP055104309.

*Primary Examiner* — Matthew Bradley
(74) *Attorney, Agent, or Firm* — Baker & Hostetler LLP

(57) ABSTRACT

An asset management method implemented on an integrated circuit uses a keys memory storing keys, each key being associated with an asset identifier, and a data memory storing asset information. The method comprises: receiving an input command for an asset comprising an asset identifier and asset information, computing addresses to Keys memory from the asset identifier, the computing addresses comprising calculating hashes from the asset identifier, finding or allocating an entry in keys memory for the asset, based on the computed set of addresses, depending on the input command, computing a data address to the data memory for the asset from the address and position in the keys memory at which an entry has been found or allocated for the asset; reading data in the data memory at the computed data address; and executing the input command based on the data read in the data memory at the data address.

18 Claims, 6 Drawing Sheets

ASSET MANAGEMENT DEVICE AND METHOD IN A HARDWARE PLATFORM

CROSS-REFERENCE TO RELATED APPLICATION

This application claims priority to foreign European patent application No. EP 13306356.0, filed on Oct. 1, 2013, the disclosure of which is incorporated by reference in its entirety.

FIELD OF INVENTION

The invention generally relates to data processing systems, and more particularly to a method and a system for managing assets in a hardware platform, such as financial orders.

BACKGROUND

As there is a growing need for faster processing of large volumes of data in financial industries, data processing systems based on clusters relying on general-purpose CPUs show a number of limitations. Indeed, if cluster approaches involve inexpensive hardware and provide tools that simplify the development, they have a number of constraints which are all the more significant as the requirement for high performance computing increases: high electricity consumption, costly maintenance, important space required for data centers. Further, the overall performance obtained with a cluster does not increase proportionally with the number of clusters. Unlike the cluster approach, data processing systems based on FPGAs allow execution of complex tasks in parallel with an important throughput, with a limited number of machines equipped with FPGAs. Accordingly, this hardware approach appears particularly suitable for the development of applications in the field of financial and investment industries where fast calculation is key to remain competitive.

An FPGA (acronym for Field-programmable gate array) designates an integrated circuit which can be configured after manufacturing. The configuration is generally specified using a hardware description language (HDL). FPGAs contain a huge number of programmable logic components ("logic blocks"), and a hierarchy of reconfigurable interconnections that allow the blocks to be "wired together". Logic blocks can be configured to perform complex combinational functions, or merely simple basic logical operations (boolean AND, OR, NAND, XOR etc.). As FPGA can perform parallel calculations, a same algorithm can be executed simultaneously for a number of independent inputs in only a few clock cycles. FPGAs are thus particularly suited for executing complex computation very fast.

For these reasons, more and more market data processing systems are designed using FPGAs.

Market data processing systems generally comprise an order management device for storing the details related to each financial order identified in the input commands in a data structure, such as a hash table. The order management device further manages the access to this data structure depending on the input commands. For example, the order management structure may add an order to the data structure if an add command identifying an order is received, or delete an order from the data structure if a delete command is received.

However, current order management devices provide poor performance and are not able to withstand the operation rate associated with the 10 Gb/s throughput of the latest network connections. A known approach to overcome such deficiencies is to spread the load over several servers, each processing only a part of the data feed. However, this increases the total system's latency, which is not desirable.

As a result, this creates a need for an improved order management device based on hardware solutions (hardware acceleration), in particular solutions built around FPGAs.

SUMMARY OF THE INVENTION

In order to address these and other problems, there is provided an asset management method as defined in the appended independent claim 1, and an asset management device as defined in appended claim 8. Preferred embodiments are defined in the dependent claims.

The invention allows processing more messages per unit of time than the prior art.

More generally, the asset management device and method according to the embodiments of the invention further allows fast command execution. Further, the use of reconfigurable platforms optimizes the space required for data processing and provides energy saving.

Further advantages of the present invention will become more apparent from the following detailed description considered with reference to the accompanying drawings.

BRIEF DESCRIPTION OF THE DRAWINGS

Embodiments of the present invention will now be described by way of example with reference to the accompanying drawings in which like references denote similar elements, and in which.

DETAILED DESCRIPTION

Figure 1:
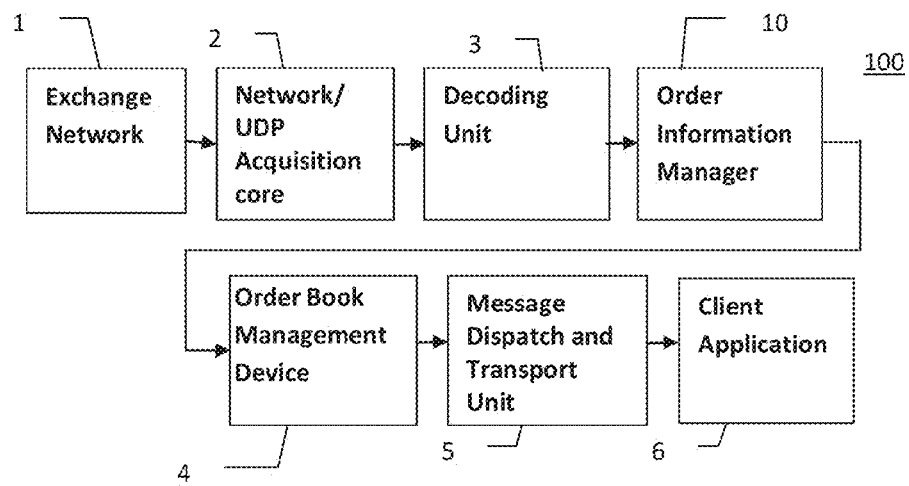
FIG. 1 represents exemplary market data processing architecture.

Embodiments of the present invention provide an asset management device and method which may be used in a data processing system, such as a market data processing system, for storing and retrieving assets associated with asset identifiers. FIG. 1 shows an exemplary market data processing system 100 for acquiring and processing market data delivered from one or more data sources such as financial exchanges, in which an asset management device 10, according to certain embodiments of the invention may be used. The term "market data" as used herein refers to data received in the form of a data stream from a number of external sources that may comprise quote and trade-related data (equity, fixed-income, financial derivatives, and other investment instruments).

The data processing architecture 100 comprises at least one decoding unit 3 (also referred to as "market data packet decoder") that interacts with feed sources for handling the market data streams received in a given source-specific protocol (e.g. FAST or FIX), and decodes them. The decoding unit 3 converts the data streams from their source-specific format into an internal format (data normalization process). According to the message structure in each data feed, the decoding unit 3 processes each field value with a specified operation, fills in the missing data with value and state of its cached records, and maps it to the format used by the system. The decoding unit 3 may then call selected order management routines based on the decoded message.

The asset management device 10 (also referred to as an "order management device" in the following description) is configured to store details related to each received order so as to retrieve the orders when they are needed. A limits aggregation and book building device 4 aggregates the orders that are pending into order books, presents for each instrument a list of orders, possibly aggregated into limits and sorted by price.

As used herein, an order book refers to the electronic collection of the outstanding limit orders for a financial instrument, such as for example a stock. The terms "order" or "limit order" or "market order" refer to an order to buy or sell a given quantity of a financial instrument at a specified limit price or better, or at the market price for market orders. Further, as used herein, the term "limit" refers to a "line" or "entry" in an order book that corresponds to one or several orders. When it corresponds to several orders it is also called an "aggregated limit". Limits are aggregated by price, i.e. the orders that have the same price have their quantities added up to form the limits quantity. An aggregated limit can also have an "order count" property reflecting the number of orders that have been aggregated in this limit.

The Limits Aggregation and Book Building device 4 takes the orders which are mixed in the memory of the order management device 10, and sorts them by book (also referred to as "order book"), using the instrument identifier passed in each command. Order books can comprise orders from several instruments or the same instrument on different markets (consolidated books). Further, the limits aggregation and book building device 4 takes each individual order of the same book and side (bid or ask side) and matches them by price, adding their quantity. As used herein, the size or quantity of an order designates the number of shares to be bought or sold.

A Message Dispatch and Transport unit 5 then formats the processed data in messages and dispatches them to selected client applications 6 for further processing and decision taking. When client applications 6 are located on different servers, message transport can be done over a network.

The role of the Order Management device 10 is to store and retrieve financial orders. The messages coming from an exchange sometimes do not carry all the necessary information to readily use them. For example, an add message, representing a command for adding an order in the order book, contains all the needed information, while a delete message, representing a command for deleting an order in the order book, only carries the order's identifier. In such cases, where the message does not carry sufficient information, the receiver of the message needs to retrieve the order, its associated price and quantity, and even, on some markets, its instrument and side (bid or ask side), and then execute the operation, for example delete the order.

Existing order management devices 10 are implemented in software. They generally use a hash table, or a hash map.

Figure 2:
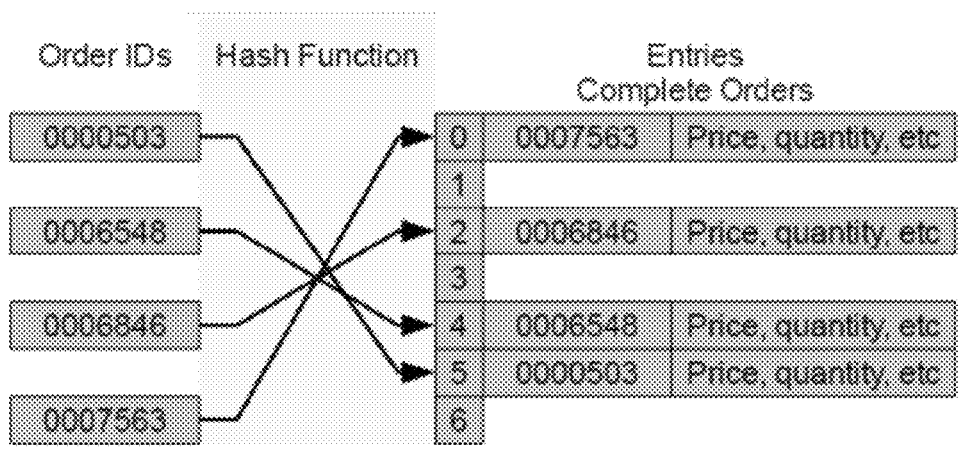
FIG. 2 illustrates the operation of a hash table.

A hash table represents a standard software component, available through several libraries and languages. The keys for these hash tables are the Order Identifiers (order ID), the values are the complete orders, or pointers to these orders. A hash table associates to each key (Order ID) an address, computed using a hash function, as represented in FIG. 2. This address is then used to retrieve the value (complete order) in memory. The Order ID cannot be used directly as an address because the order IDs are coded on more bits than there are memory address bits, and are therefore too long. Further, there are generally more possible IDs than there are available memory locations. With such data structures, "collisions" often occur when the hash function generates the same address for more than one Order ID. To overcome the problem of collisions, some existing order management devices use several hash functions to have alternative addresses when collisions occur, or chain several orders in each hash table entry. Other solutions are based on an efficient hash function that tries to spread the orders evenly over the whole memory to avoid collisions.

However, these types of data structures generate a lot of random memory accesses because the order IDs do not appear in a sequential way in the market data stream, and the hash function distributes these already-random IDs evenly over the whole memory. Further, with data sets like those needed for storing all the live orders of a large set of instruments, this generates a lot of CPU (acronym for "Central Processing Unit") cache misses, leading to poor performance.

A lot of existing hardware systems in all technological fields use hash tables which can be of two types: Read-only hash tables and hash tables based on state machines or counters.

With Read-Only hash tables, the hardware system does not modify the contents of the hash table. The static nature of the memory reduces the overall complexity and allows pipelining the whole algorithm easily. U.S. Pat. No. 7,921, 046 describes a system using such a hash table. However, such system is not suitable for an order management Device because it needs to add and update its entries as the data from the market is received.

Hash tables based on state machines or counters are configured to add and modify entries, but can only process one message at a time. The execution time of a message depends on the type of memory used. For example, the execution time takes 5 to 6 clock cycles for internal FPGA memory, and 10 to 15 cycles for a low latency external memory like QDR (acronym for "Quad Data Rate"). Due to the time it takes to process a message, existing solutions using such hash tables cannot withstand a 10 Gb/s market data bandwidth. Indeed, this would require processing a message every 2 clock cycles, a message being received at most every 2 clock cycles and only one message being processed at a time (with an average FPGA core running at 200 MHz).

Accordingly, conventional order management devices do not allow processing enough messages per unit of time.

The inventors first found out that the number of messages processed per unit of time could be increased by increasing the clock frequency of the hash table with respect to conventional approaches. Such approach would require providing shorter cycles while maintaining the same number of clock cycles required to process a message stay the same, is shorter. However, such approach is complex to implement as both the FPGAs and the memories used are limited in frequency. Thus, the gain that could be achieved through such approach would only marginally enhance performance.

Another contemplated approach was to modify the hash table algorithm so as to use less clock cycles per message.

However, this approach is also complex to implement because the latency of the memories cannot be changed by the user, and the FPGA requires a few cycles to clock the data in and out of its input/output blocks. The expected gain with such approach would amount a few cycles out of the 15 cycles that a state-based hash table would require, only marginally enhances performance.

The present invention provides an improved order management device based on a hash table like structure for managing orders received by external sources.

Although the invention presents particular advantage for management of financial orders, the invention also applies to management of other types of assets in different application domains, where the assets are associated with asset identifiers. The following description will be made with reference to management of financial orders (as assets) for illustrative purpose only.

Figure 3:
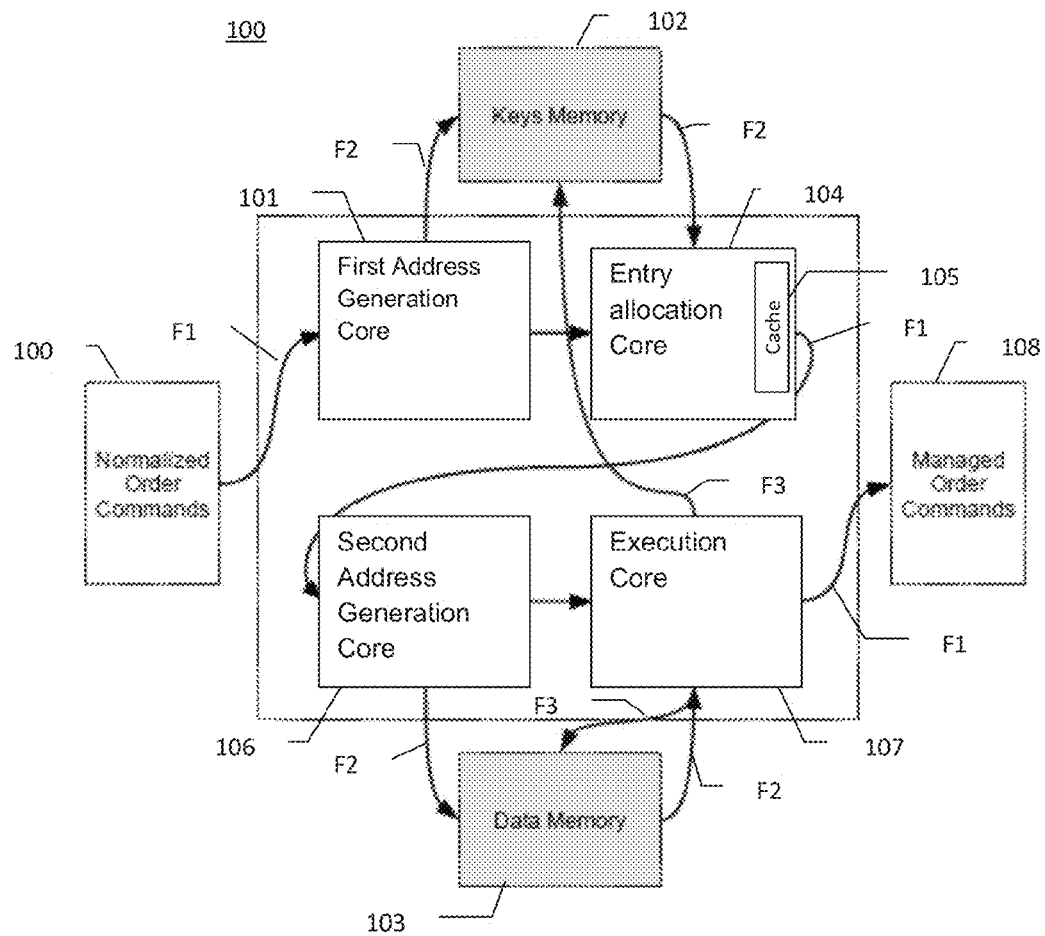
FIG. 3 represents the architecture of the order management device according to certain embodiments of the invention.

FIG. 3 illustrates the architecture of the asset management device 10 (referred to thereinafter as "order management device"), according to certain embodiments of the invention.

The order management device 10 is built around a parallel processing device, such as an FPGA, surrounded by external memories, and network interfaces. The following description will be made with reference to a parallel processing device of FPGA type, for illustrative purpose only.

As part of the market data processing system of FIG. 1, the order management device 10 generally receives normalized output commands from a data packets decoding device 3. More specifically, the data packet decoding device 3 receives market data streams, and based on the market data streams outputs normalized command 100 for each message that are the same across all the markets, which makes the cores that follow (order management device 10, limits aggregation and book building device 4, etc.) market-independent, and makes it possible to develop these cores only once.

Each normalized command 100 may comprise an operation code (or "opcode") that indicates the type of operation to execute, an order ID, and a field for each characteristic of the order (instrument ID, side, price, quantity, etc). When this command is transported on a streaming bus, an extra "valid" signal may be used to flag the command as valid, and a "ready" signal for back pressuring (standard Avalon ST).

The order management device 10 according to the invention is based on a pipelining approach that allows for the execution of several messages at the same time. The pipelined process is divided in smaller processing steps, each part processing one message at a time, so that the whole order management device 10 can process several messages at the same time. The order management device 10 according to the invention is in particular provided to address the situations where some of the messages being processed in parallel refer to a same order. Advantageously, although these messages are treated at the same time, the result is the same as if they had been processed sequentially.

By pipelining the order management device 10, more cycles are used for each command because of synchronization and communication issues between the different sub-cores. However, raising the clock frequency is eased because more register stages can be inserted without degrading the performance. Accordingly, the order management device 10 can be used at higher frequencies, matching the frequency of the external memory to use it at its full potential, and canceling the performance degradation caused by the clock cycles used for synchronization and communication. The overall latency of the order management device according to the invention is thus the same as if it were not pipelined, while being able to process commands at a higher throughput.

The pipelined order management device according to the invention is in particular arranged to solve the problem of multiple commands with same identifiers.

In FIG. 3, the F1 arrows designate the main data path, the F2 arrows designate the memory reads, and the F3 arrows designate Memory writes.

It should be noted that FIG. 3 is only a functional representation of the order management device 10 and that some small support cores (FIFOs between the sub-cores, adapters, memory controllers, etc) are not shown in order to facilitate the comprehension of this figure.

Each entry in the internal data structures of the order management device 10 is associated with a given order identifier.

The information related to each order is maintained in a Data Memory 103. The information maintained in the data memory 103 may comprise the instrument, the side (bid/sell), the price, and the quantity of the order.

According to an aspect of the invention, the order related information is stored in the data memory 103 at an address that is computed from hashes based on the order identifier.

The Order Identifiers (IDs) in the input messages are used by the order management device as keys to identify the orders. The order identifiers are made unique across all the markets processed by the same system by appending a Market identifier to them. The order IDs (and thus the keys) may be for example integer number on 64 bits.

The order management device 10 comprises a Keys Memory 102 for storing information related to the keys associated with the order identifiers.

The Keys Memory 102 stores words of data, each word of data comprising couples {key, presence bit}. The presence bit associated with a key identifies whether the key in the keys Memory 102 has been assigned to an order ID (e.g. presence bit=1 in this active state) or not (e.g. Presence bit=0). The key Memory 102 comprises in particular as many couples {key, presence bit} as possible to fit in the physical memory. This allows fully using the memory bandwidth when searching for an entry.

The Keys Memory 102 and the Data Memory 103 may be provided either in internal FPGA memory, or in external memory chips. In a particular embodiment of the invention, both Keys and Data memories 102 and 103 may be provided in the same physical memory. In such embodiment, Keys Memory 102 and Data Memory 103 share the total memory bandwidth, and an arbiter entity may be provided to arbitrate between the concurrent accesses. In particular, the arbiter entity may handle one of the addresses in a way that prevents both memory regions from overlapping.

The arbiter entity may be further configured to let the commands of one of its inputs through and backpressure the other inputs. It comprises a configurable function for selecting the input which commands are to be let through (configuration may be performed based on a priority or based on round robin). An offset can be added to the address of one of the inputs of the arbiters (addition), at the instantiation of the arbiter, to implement the function for avoiding overlapping between both memory regions.

As shown in FIG. 3, the order management device 10 comprises four main components (also referred to thereinafter as "cores") interacting with the key memory 102 and the data memory 103:

A first Address Generation Core 101 that receives the normalized commands 100 for generating keys memory read commands (F2) in order to read Key information from the key memory 102 and compute key addresses from the read keys;

An entry allocation core 104 for determining location of an entry corresponding to an order that is to be deleted or modified, or allocating entries for newly received orders based on the address computed by core 101 and the keys read in memory 102; It may further forward (as represented by arrow F1) to the other cores the address and position at which the entry is found or allocated;

A second address generation core 106 for generating read commands (F2) to the data memory 103 in order to read data associated with a given order (already having a corresponding allocated entry in the keys memory 102) based on the address provided by the entry allocation core 104; and an execution core 107 for executing each received command (order add command, order delete command, etc.) based on the entry address identified in the input command, the type of the input command forwarded from the previous cores on its input interface, and the data associated with the considered order received from memory 103. The execution core 107 writes (arrows F3) the result back to key memory 102 (if command execution involves change to key information) and/or data memory 103 (if command execution involves change to order data information).

Thus the order management device 10 comprises two parts: the first part, including the first Address Generation Core 101 and the entry allocation core 104, is responsible for keys management, while the second part, including the second address generation core 106 and the execution core 107, is responsible for asset value management.

More specifically, the first Address Generation Core 101 comprises hash functions and is configured to generate keys memory read commands (F2) to keys memory 102. Each generated command comprises the address of the memory word to read. According to one aspect of the invention, the order ID is hashed by a configurable number of hash functions, generating one or more hashes used as addresses.

In one embodiment of the invention, the hash functions represent multiplicative hashes obtained by using an FPGA hardware multiplier (Hardware multipliers are logic circuitry dedicated to multiplications, generally available in FPGAs). Hardware multipliers allow doing multiplications efficiently, using less general-purpose logic. They further allow higher clock speeds to be reached than if the multiplication was done with general-purpose logic. More specifically, the FPGA hardware multiplier is configured to multiply the Order ID by a given coefficient. The higher and lower bits resulting from the multiplication may then be dropped to keep the suitable number of bits to address the whole keys memory. The middle bits are selected because they provide the most variance for any given input bit.

One advantage of the multiplicative hash is that no additional resource is required (the hardware multipliers are already available) and provides hashes of satisfying quality. However, the skilled person will readily understand that the invention is not limited to multiplicative hash and that the computation of the hash that can be performed differently, in particular based on logic functions, arithmetical operations, etc.

Figure 4:
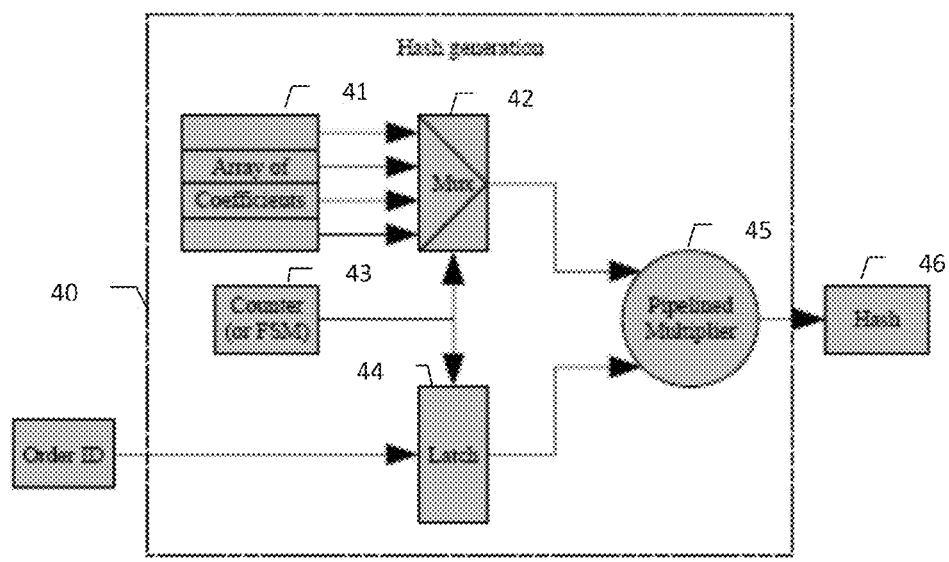
FIG. 4 is a functional diagram illustrating the hash generation according to certain embodiments of the invention.

FIG. 4 is a functional diagram illustrating the generation of hashes 46 from order ID 40, according to certain embodiments of the invention.

Different hashes 46 may be obtained by varying the coefficient used for the multiplication. The core 101 may comprise a list of coefficients 41, chosen randomly (using a multiplexer 42). The coefficients 41 may be used sequentially to provide the desired number of hashes 46. Pipelining is then achieved by enabling pipelining on the multiplier 45 and latching the order ID during the cycles corresponding to the different hashes computation. The latching of the order Identifier may be performed using a latch 44 which may be controlled by a counter or a finite state machine FSM 43.

In certain embodiments of the invention, several memory chips may be used in parallel (102 and/or 103). In such embodiments, the first Address Generation Core 101 generates a different hash for each memory, reducing the effect of hash collisions. Furthermore, better performances may be obtained by providing the keys memory 102 and the data memory 103 on the same physical chips, and by accessing to these chips in parallel.

Turning back to FIG. 3, the entry allocation core 104 is arranged to perform entry allocation and forwards to the other cores (106, 107) the address and position at which the entry is found or allocated, depending on the type of the input command received by the order management device 10. The entry allocation core 104 may allocate a new entry in the keys memory to an order ID in response to an add command. The entry allocation core 104 is configured to locate (or find) an entry in the keys memory in response to other types of commands such as a delete or a modify command.

Depending in the type of the input command (add, modify, delete, etc.), the entry allocation core 104 receives data words from the keys memory 102, as previously requested by the first Address Generation core 101.

To add an entry, the entry allocation core 104 may take the first available slot in the received data words returned by the memory 102. More specifically, in response to a command for adding an entry for an order ID, the entry allocation core 104 may look up for an available entry slot in every word of data and if such an empty slot is found, the address of the available entry is sent on the output, along with the position of the slot in the data word and the original input command. If no available entry is found (the memory is full), an error code may be sent.

When a command for modifying or deleting an order is received, the entry allocation core 104 may receive a request from the first Address Generation Core 101. In response to this request, the entry allocation core 104 is configured to look up for an entry that matches the order ID in the input command in every word of data returned by the keys memory 102. If the entry is found, the address of the entry is sent on the output, along with the position of the entry in the data word and the original input command. If the entry associated with the order ID cannot be found (the entry does not exist) an error code may be sent.

In the preferred embodiments of the invention, the core 104 does not directly write the allocated entries to the memory so the data read can be out of date.

In other embodiments of the invention, the entry allocation core 104 may write the modified entries to memory 102 directly. Yet, even in such embodiments, the data could be outdated. Indeed, the read commands are sent by the keys memory 102 so that a read command could be issued before the entry allocation core 104 has finished processing the previous command. If both commands (current read command and previous read command) concern the same order, or an order stored at the same address because of a collision in the hash function, the data read could be outdated.

To avoid such situation, the order management device 10 may further comprise a cache 105 for keeping track of the last processed order identifiers, as well as the addresses and positions at which the corresponding order identifiers have been placed. The cache 105 may be comprised in the entry cache and key comparison core 104 and may be seen as a set of registers which are updated at each allocation of an entry in the keys memory (add). When an address which is in the cache 105 is received via the input interface of core 104, the data in cache 105, which is necessarily more recent since it is updated instantaneously, is used instead of the data received from the memory.

The second address generation core 106 is provided to generate the read commands to the data memory 103 for storing order information associated with an entry of the keys memory (such as the instrument, the side (bid/sell), the price, and the quantity of the order). The data read by the second address generation core 106 are sent by data memory 103 to core 107. The order related information is stored in the data memory 103 at an address that is derived from the address and the position in the data word of the key provided by the Entry allocation core 104. When the keys memory 102 and the data memory 103 are provided in the same physical memory, the order management device 10 may be arranged so as to ensure that, when using the same memory to store the keys and the order data, both memory regions do not overlap (using the arbiter entity).

The execution core 107 is provided for executing each command. The execution core 107 writes the obtained result back to keys memory 102 and data memory 103.

The execution core 107 receives the data needed to actually process a command. It receives the address of the entry identified in the input command, the input command forwarded from the previous cores on its input interface, and the properties of the considered order (price, quantity, etc) from the data memory 103.

The execution core 107 is in particular configured to execute the following types of operations:
- In response to an add command, the execution core 107 creates the order in the internal data structures 102 and 103. The order's entry in the keys memory 102 has been previously allocated by the Entry allocation core 104. The order's properties are copied from the input command.
- In response to a delete command, the execution core 107 removes the order from the internal data structures 102 and 103 by setting the presence bit associated with the order ID in the keys memory 102 to zero.
- In response to a reduce command for a given order ID, the execution core 107 accordingly reduces the quantity associated with the order ID by the specified amount. This amount is specified in the reduce command. The execution core 107 subtracts the amount specified in the reduce command from the quantity stored in memory in association with the order. If the remaining quantity associated with the order ID is equal to zero, the order is directly deleted, as if the command was a delete command.
- In response to a modify command associated with a quantity and/or a price, the quantity and/or the price corresponding to the order identifier are replaced by the quantity and/or price specified in the input command, while the other information maintained in the internal data structures (102, 103) remains unchanged. The instrument ID and side are maintained.

The execution core 107 is further responsible for processing several versions of an "execute" command received from a market. An execute message is formatted differently depending on the market that sent it. Most markets even use several variations of an execute command at the same time. In particular, to reduce network bandwidth, they use the more restricted variations when possible. Some variations of this command thus give the remaining quantity, others work like the reduce command where they send only the quantity to remove. In all cases, when the remaining quantity is null, the order is deleted.

In response to a replace message, requiring deletion of a given order referenced by an order identifier and creation of a new order, associated with a different order ID, price and quantity but with the same instrument and side as the replaced order, the execution core 107 converts the replace command into a "delete and store" command followed by an "add stored" command. Both commands comprise an order ID, and thus behave like a regular delete and add command. However, the "delete and store" command also stores the instrument and side, and the "add stored" command uses this additional information instead of taking it from the input command.

Once executed, the result of the operation is written back to the keys memory 102 and the data memory 103.

The execution core 107 may thus perform two write operations:
- A write operation to the keys memory 102 to store the Order ID and the presence bit, or delete them;
- A write operation to the data memory 103 to store the order's properties.

According one embodiment of the invention, the execution core 107 is the only core that can trigger deletion of orders when the final quantity depends on the quantity in memory, so all the writes operations are done in this core, especially the writes to the keys memory 102.

The execution core 107 may further comprise a cache as the core 106 generating the read commands (represented by arrows F2) for the data memory 103 is placed before the execution core 107. The cache of the execution core 107 comprises the identifier and the properties of the last orders processed. The cache information is used to replace the properties read from the data memory 103 when the order ID matches, before actually processing the command.

As the core 107 is pipelined, the command rate that is accepted does not depend on the number of clock cycle required by the processing. There is accordingly no particular constraint on the number of clock cycles required by the 4 cores 101, 104, 106, and 107. This allows an easy increase on frequency.

Figure 5:
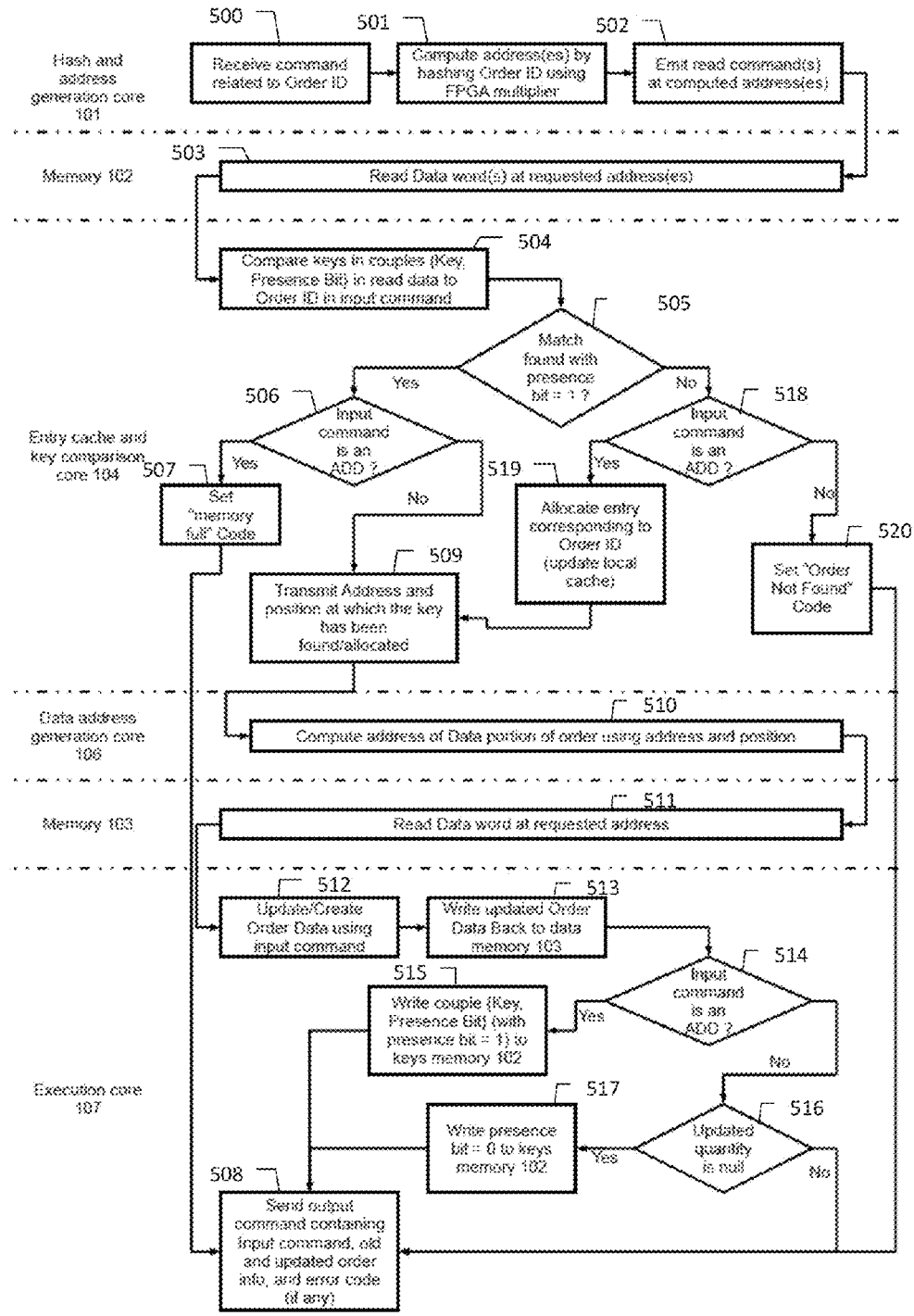
FIG. 5 is a flowchart according to certain embodiments of the invention.

FIG. 5 shows the different steps of the order management method according to the invention.

In step 500, a command related to Order ID is received comprising an order identifier and a set of order information.

In step 501, one or more addresses are computed by hashing Order ID using for example an FPGA multiplier.

In step 502, read commands are emitted at the addresses computed in step 501.

In step 503, data words are read at the requested addresses in the Key Memory 102.

In step 504, the keys in couples {Key, Presence Bit}, in the read data, are compared to the Order ID in the input command.

If a match has been found with a presence bit equal to 1 (step 505), and if the input command is an ADD command (506), a "memory full" Code is set in step 507. Then, an output command comprising the Input command, and possibly old and updated order Information, and/or an error code is sent at step 508.

Otherwise, if the input command is not an ADD command (506), address and position at which the key has been found are transmitted to the Data address generation core 106, in step 509.

In step 510, the address of the data portion of the order is computed using the address and position information transmitted in step 509. Then, in step 511, data words are read from Data memory 103, at the requested address. Order Data may be then created or updated using input command in step 512, and the updated Order Data may be written back to data memory 103.

If the input command is an ADD command (514), the couple {Key, Presence Bit} (with presence bit=1) is written to keys memory 102 in step 515. Then the output command comprising the Input command, and possibly old and updated order Information and/or an error code are sent at step 508.

If the input command is not an ADD command (514), in step 516, it is determined if the Updated Quantity is null and if so, in step 517, the presence bit is set to zero in keys memory 102. In both cases, the output command comprising the Input command, with possibly the old and updated order information, and/or an error code are sent in step 508.

In step 505, if no match has been found (or if a match has been found but with a presence bit different from 1), and if the input command is an ADD command (518), an entry corresponding to Order ID is allocated in step 519 (by updating local cache of Core 104) and in step 509 the Address and position at which the key has been allocated are transmitted to the Data Address generation Core 106. Execution Steps 510, 511, 512, 513, 514, 515, 508, 516, and 517 may be then performed.

If it is determined that the input command is not an ADD command, in step 518, an "Order Not Found" Code is set (520) and then step 508 is performed to send an output command comprising the Input command, with the old and updated order information and/or an error code if any.

As shown in FIG. 5:
Steps 500, 501 and 502 may be implemented by the first address Generation Core 101;
Step 503 may be performed by accessing the Key Memory 102;
Steps 504, 505, 506, 507, 509, 518, 519 and 520 may be performed by the Entry allocation core 104;
Step 510 may be performed by the Second Address Generation Core 106;
Step 511 may be performed by accessing the Data Memory 103; and
Steps 510, 511, 512, 513, 514, 515, 508, 516, and 517 may be performed by the Execution Core 107.

Figure 6:
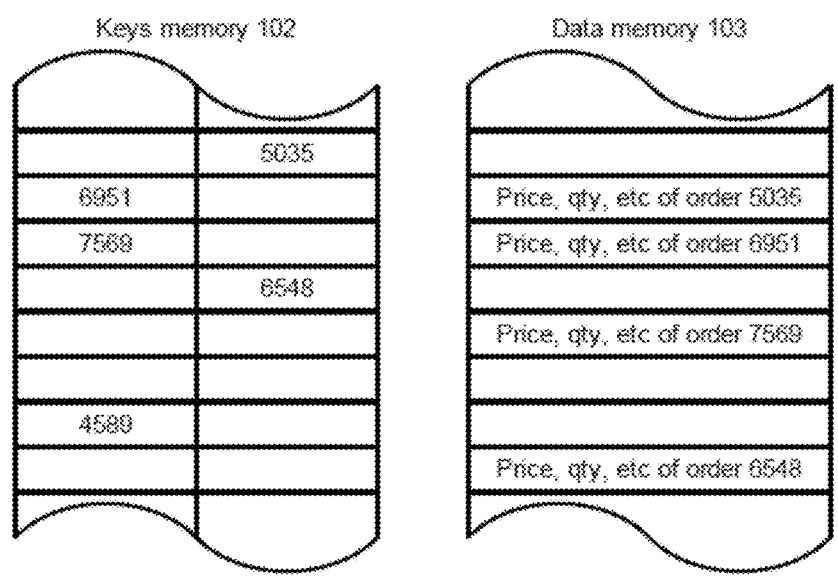
FIG. 6 shows an exemplary asset management device according to certain embodiments of the invention.

FIG. 6 represents an exemplary Asset Management device according to certain embodiments of the invention. More particularly, it represents partial views of the Key memory 102 and the Data memory 103. Each line in the memory 102 or 103 represents a word of data. Keys memory 102 comprises 2 couples {presence bit, key} per word. Data memory 103 comprises one value per word. The presence bits in keys memory 102 are not represented.

In the example, the relation between the data address and the key's address and position is:

Data address=Key address×2+Position

Where the position is 0, on the left side (orders 6951, 7569 and 4589), and 1, on the right side (orders 5035 and 6548).

This relation may however depend on the data widths of the memories and the data width of the orders' keys and data.

The data of order 4589 is not represented. It would be further below order 6548's data, outside of the represented area.

With the described embodiments of the invention, the asset management device 10 can process more messages per unit of time than conventional asset management devices. The four-fold structure of the asset management device 10 (cores 101, 104, 106 and 107) and the interactions between the cores also contribute to the obtained performances.

By separating Keys Memory 102 and Data Memory 103 it is possible to use all the memory bandwidth to obtain keys, while not impacting the data memory. It is particularly interesting when using memories that are external to the FPGA.

Further, the pipelined design of the asset management device allows for an easier increase in frequency, and thus for satisfying performances.

Another advantage of the invention is related to the fact that the entry allocation core 104 can read a maximum number of keys per clock cycles, thereby fully using the memory bandwidth.

The use of caches in the entry allocation core 104 and the execution core 107 make it possible to achieve an efficient pipelined design.

The asset management device 10 according to the described embodiments of the invention, and particularly the execution core 107, is adapted to directly integrate the business logic. This avoids round trips between a standard hash table and a business core which would instantiate the hash table. For example, for modifications that would involve a null quantity, incorporating the business logic in the core obviates the needs for the following steps:
First sending a request to the hash table to obtain the order details,
Then, once a null quantity has been detected, sending a second request to the hash table to delete the order corresponding to the quantity;
Such steps would highly impact the performances as it would be necessary to wait until the first request has traversed the hash table before emitting the second request.

It should be noted that the business logic can be integrated to only a part of the asset management device 10: in the example of a market data processing application, it may be integrated to only a part of the core 107 related to the financial application. Specificities can then be contained and easily maintained or modified.

Figure 7:
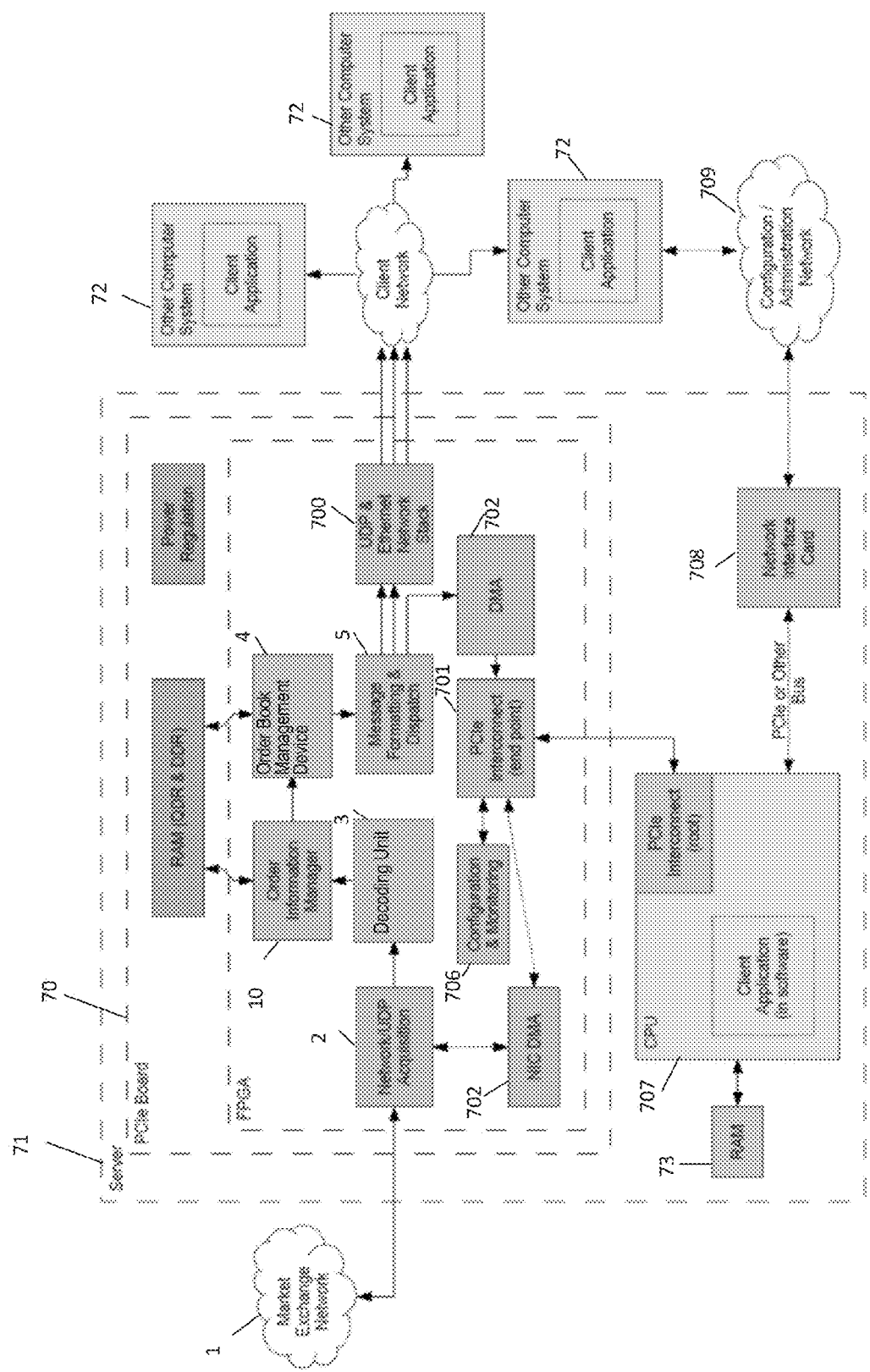
FIG. 7 is a block diagram illustrating an exemplary FPGA implementation in accordance with certain embodiments of the present invention.

FIG. 7 shows an exemplary implementation of the Market Data Processing system 100, in an FPGA on a PCIe Board 70 inside a standard server (host system) 71. The chain (Network/UDP Acquisition 2, Decoding unit 3, Order Information manager 10, Order Book Management Device 4, Message Dispatch and transport Unit 5) represented in FIG. 1 may be complemented by:
a UDP & Ethernet Network Stack 700 configured to send output messages on a standard Ethernet network. For an optimal performance, this core may be connected to the client network by as many Ethernet connections as clients on said network. Client applications in other computer systems 72 on that same network may be implemented in software, accelerated in hardware or alternatively completely implemented in hardware. Alternatively, client applications can be connected directly to the system's output ports, to save the latency added by the network equipment(s).

A PCIe interconnect end point 701 configured to connect to the host system.

a DMA ("Direct Memory Access") 702 configured to send output messages to the host system's RAM 73 via the Board's PCIe connection; a Client application can thus be run on the host system's CPU 707, and consume the messages sent by the DMA.

A second "NIC" DMA 704 ("NIC" is the acronym for Network Interface Card) configured to receive and send Ethernet packets from/to the host system's software, through the Ethernet ports normally used by the Market Data Processing system's hardware. The PCIe board 70 can thus be seen as a normal Network Interface Card by the Operating System. This may be needed for various practical purposes (such as sending multicast group subscriptions, logging into the Market Exchange's systems, being able to check the connectivity). The important, latency-sensitive, data may be handled directly by the hardware, while the rest may be handled in software in certain embodiments. Such configuration also allows a direct connection to the exchange's network 1, without an extra hop through a network switch or router.

configuration & monitoring logic 706 for configuring the other cores, including for example subscribing to financial instrument updates, and monitoring the system's status and performance through the PCIe connection. Software may be provided to be executed on the host's CPU 707, for exploiting this configuration & monitoring logic, through a software API.

Along the FPGA, the PCIe Board 70 provides memory chips which may be used by the Market Data Processing system 100 as "external memory", and various support functions such as power regulation to power the components on the Board with the various voltages they need. It may also include physical connectors for the multiple Ethernet connections.

Several of such Boards can be plugged in PCIe slots of a Host System. This allows to scale the processing power, in order to, for example, support more market exchanges. Boards can communicate with each other via the host's PCIe interconnect.

The Host System 71 may be a standard computer server. The CPU 707 may be chosen to have a direct PCIe connection to the PCIe board(s) hosting the Market Data Processing system(s), for maximum performance of the Client Application run on it. The host system can also be equipped with a network interface 708 to connect to a Configuration and Administration Network 709. This allows to have a dedicated network for configuring and administration the server. The server can also be equipped with any standard component, such as a mass storage device (hard drive).

Physically separating the Market Exchange Network, the Client Network and the Configuration and Administration Network, has advantages in terms of security and performance.

Even if the invention is not limited to the use of PCIe to interface the FPGA to the Host System, the PCIe as particular advantages as it is currently the most widely used bus for high speed transfers between a server and add-on cards. The skilled person will however readily understand that the Market Data Processing system 100 could be interfaced via any other bus.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In particular, the present invention is not limited to the management of assets of the type "orders" and to financial applications. It can be applied to other applications by changing the business logic included in execution core 107, or even removing the business logic included in execution core 107. Further the invention is not limited to multiplicative hash. The skilled person will readily understand that any function capable of mixing sufficient bits can be used as a hash function.

The invention claimed is:

1. An asset management method, said method being implemented on an integrated circuit, wherein the integrated circuit comprises a keys memory for storing keys, each key being associated with a respective asset identifier, and a data memory for storing asset information, said method comprising:

receiving an input command related to a first asset comprising a first asset identifier and asset information associated with said first asset, computing a first address to said keys memory from said first asset identifier, said step of computing a first address comprising calculating a hash from said first asset identifier, searching for an entry in said keys memory for said first asset, based on said first address, allocating a new entry in said keys memory for said first asset when it is determined that no entry for said first address has been found in said keys memory, computing a first data address to said data memory for said first asset from the address and position in the keys memory at which an entry has been allocated for said asset, reading a data word in the data memory at said first data address, executing the input command based on the data word read in the data memory at said first data address, and writing back the result to the keys memory and data memory.

2. The method of claim 1, wherein each key in said keys memory is associated with a presence bit, the method further comprising, in response to the allocation of an entry, setting the presence bit associated with the entry key to an active state.

3. The method of claim 2, wherein each key and the associated presence bit form a couple and the couples are arranged in the key memory to condense couples in each data word.

4. The method of claim 1, further comprising storing said asset information in association with said asset identifier in said data memory, in response to the allocation of said entry.

5. The method of claim 1, wherein the integrated circuit further comprises at least one cache for keeping track of the last processed asset identifiers, as well as the addresses and positions at which the corresponding asset identifiers have been placed.

6. The asset management method of claim 1, further comprising the steps of:

receiving an input command related to a second asset comprising a second asset identifier and asset information associated with said second asset, computing a second address to said keys memory from said second asset identifier, said step of computing a second address comprising calculating a hash from said asset identifier, determining that an entry has been found in said keys memory for said second address, computing a second data address to said data memory for said second asset from the address and position in the keys memory at which an entry has been found for said second asset, reading a data word in the data memory at said second data address, executing the input command based on the data word read in the data memory at said second data address, and writing back the result to the keys memory and data memory.

7. The asset management method of claim 6, further comprising:

computing a plurality of addresses to said keys memory from each said asset identifier, said step of computing a plurality of addresses comprising calculating a hash from said asset identifier for each computed address, and searching for an entry in said keys memory for each said asset based on each of said plurality of computed addresses.

8. The method of claim 7, wherein a plurality of memory chips are used in parallel, and said step of computing a plurality of addresses comprises calculating a different hash for each memory.

9. The method of claim 7, wherein said hashes are obtained by multiplying each asset identifier by a given coefficient, which provides a data word, and selecting some of the bits of said data word.

10. An asset management device implemented on an integrated circuit, wherein said device comprises a keys memory for storing keys in association with respective asset identifiers and a data memory for storing asset information, the device further comprising:

an address generation core configured to, in response to the reception of an input command comprising a first asset identifier and asset information, compute a first address to said keys memory from said first asset identifier, said computation of said first address comprising calculating a hash from said first asset identifier, an entry allocation core configured to search for an entry in said keys memory for said first asset based on said computed first address and, if no entry has been found in said keys memory for said first address, to allocate an entry in said keys memory for said first asset, a second address generation core configured to compute a first data address to said data memory for said first asset from the address and position at which an entry has been allocated in said keys memory, the data being read in the data memory at said first data address, an execution core for executing the input command based on the data read in the data memory at said first data address, the execution core further being configured to write back the result to the keys memory and to the data memory.

11. The asset management device of claim 10, wherein the first and second address generation cores, the entry allocation core, and the execution core are pipelined.

12. The asset management device of claim 10, wherein said keys memory is configured to store each key in association with a presence bit, the presence bit being set to an active state, in response to the allocation of the entry corresponding to the entry key associated with the presence bit.

13. The asset management device of claim 12, wherein each key memory and the associated presence bit form a couple and the couples are arranged in the key memory to condense the couples in each memory data word.

14. The asset management device of claim 10, wherein the key memory and the data memory are provided on the same physical memory, said asset management device further comprising an arbiter entity so as to provide access to the physical memory from a first part responsible for keys management, including the first Address Generation Core and the entry allocation core, and a second part responsible for asset value management, including the second address generation core and the execution core, the arbiter entity being further configured to prevent both the key memory and the data memory from overlapping.

15. The asset management device of claim 10, wherein said address generation core is configured to, in response to the reception of an input command comprising a second asset identifier and asset information, compute a second address to said keys memory from said second asset identifier, said computation of said second address comprising calculating a hash from said second asset identifier, said entry allocation core configured to search for an entry in said keys memory for said second asset based on said computed second address and, said second address generation core configured to compute a second data address to said data memory for said second asset from the address and position at which an entry has been found in said keys memory, the data being read in the data memory at said second data address, said execution core for executing the input command based on the data read in the data memory at said second data address, the execution core further being configured to write back the result to the keys memory and to the data memory.

16. The asset management device of claim 15, wherein the address generation core is further configured to compute a plurality of addresses to said keys memory from said asset identifier, said computation of said plurality of addresses comprising calculating hashes from said asset identifier, and said entry allocation core is further configured to search for an entry in said keys memory for said asset based on said plurality of computed addresses.

17. The asset management device of claim 16, wherein the hashes are obtained by using the integrated circuit hardware multiplier to multiply each asset identifier by a given coefficient, which provides a data word, and selecting some of the bits of said data word.

18. The asset management device of claim 15, wherein said entry allocation core is configured to forward an auxiliary command to said second address generation core, said auxiliary command comprising the address and position at which an entry has been found or allocated for said asset, said second address generation core being configured to retrieve said address and position from said auxiliary command.

* * * * *